United States Patent [19]

Yeary

[11] Patent Number: 4,527,771
[45] Date of Patent: Jul. 9, 1985

[54] BUTTERFLY VALVE PROTECTOR

[76] Inventor: Arthur R. Yeary, Seven Twin Lakes Cir., Corona del Mar, Calif. 92625

[21] Appl. No.: 558,924

[22] Filed: Dec. 7, 1983

[51] Int. Cl.³ .............................................. F16K 1/22
[52] U.S. Cl. .................................. 251/118; 251/305; 137/246
[58] Field of Search ...................... 251/305, 118, 127; 137/544, 550, 246

[56] References Cited

U.S. PATENT DOCUMENTS

| | | | |
|---|---|---|---|
| 1,383,482 | 7/1921 | Popp | 251/118 |
| 1,824,168 | 9/1931 | Orton | 251/118 |
| 3,256,897 | 6/1966 | Carlton | 251/118 |
| 3,426,581 | 2/1969 | Briggs | 137/246 |
| 3,958,595 | 5/1976 | Al et al. | 251/305 |
| 4,295,632 | 10/1981 | Engelke | 251/127 |
| 4,318,422 | 3/1982 | Nakanishi et al. | 137/246 |

OTHER PUBLICATIONS

Posi-Seal International, Inc., Brochure No. PSI-16-0-011.

Primary Examiner—Martin P. Schwadron
Assistant Examiner—James R. Shay
Attorney, Agent, or Firm—Gordon L. Peterson

[57] ABSTRACT

A valve comprising a valve body, a butterfly valve element pivotally mounted within the body and a guard closely adjacent the upstream edge of the valve element in the open position. The guard protects the upstream edge of the valve element from the fluid stream passing through the valve. The guard may also be used for injecting a purging material or a sealant onto the edge of the valve element, for carrying a seal and for providing an impedance to the fluid stream to reduce the fluid forces acting on the stream which tend to move the valve element toward the closed position. The guard is carried by a removable guard mounting ring.

20 Claims, 7 Drawing Figures

BUTTERFLY VALVE PROTECTOR

BACKGROUND OF THE INVENTION

Butterfly valves are in common usage for controlling the flow of various fluid, i.e., liquid or gas, streams. Butterfly valves are used to throttle fluid flow and for on-off applications.

A typical butterfly valve includes a valve body having a passage extending through it and a butterfly valve element pivotally mounted on the valve body. The butterfly valve element is characteristically in the form of a disc.

In certain instances, butterfly valves are used to control the flow of a process fluid which includes particulate and/or other foreign matter. In these instances, the edge of the butterfly valve which faces upstream in the open position is pitted or abraded by the particulates in the fluid stream. When called upon to seal in the closed position, the pitted butterfly valve element can no longer perform its function and leakage occurs through the pitted regions. The size of the leak progressively increases due to erosion, particularly in high velocity particulate-laden applications.

It is suggested in Orton U.S. Pat. No. 1,824,168 to shield the edges of the butterfly valve element utilizing a vane which is aerodynamically shaped and which is narrower than the butterfly valve element. Although the basic concept of shielding the butterfly valve element edge is sound, the narrowness of the vane is undesirable for some applications. Moreover, the vane must be bolted radially through the valve body or through the adjacent fluid-carrying conduits. This increases the likelihood of fluid leakage and complicates installation and removal of the vane.

SUMMARY OF THE INVENTION

This invention solves the problems noted above by providing a novel guard and guard-mounting arrangement. With this invention, the guard not only shields and protects the butterfly valve element, but also may be used for lubricant injection, to carry a seal and/or to reduce the fluid forces acting on the valve element tending to close the valve element.

With this invention, the guard is mounted on a separate guard-mounting ring, which may also be considered a valve body section. The guard-mounting ring is independent of the valve. Accordingly, the guard-mounting ring can be retrofitted onto existing valves and can be easily installed and removed. For example, the guard-mounting ring may take the form of a flanged spool or a thin disc or wafer-like ring that can be bolted onto a valve body section of the valve. As such, the guard features of this invention can be made applicable to valves of various different constructions.

The guard may be of various different configurations, such as a disc or an elongated finger. The guard and the guard-mounting ring are preferably integrally cast or they may be formed from an integral casting or formed separately and welded together.

The guard may be of any desired width in a plane perpendicular to the pivot axis of the butterfly valve element. In a preferred construction, the guard is wider than the butterfly valve element and the edge of the butterfly valve element which confronts the guard. One feature of this invention is to make the guard substantially wider than the confronting edge of the butterfly valve element to provide an impedance to the fluid stream to reduce the fluid force acting on the valve element near the open position which tends to move the valve element toward the closed position. By so doing, the guard, not only performs its protective function, but also impedance creation, velocity force reduction and/or liquid channeling functions similar to those described in Engelke U.S. Pat. No. 4,295,632.

To enable the guard to serve as a conductor of various flowable substances to the butterfly valve element, passage means may be provided at least partially in the guard for conveying a flowable substance through the guard to a location closely adjacent the confronting edge of the valve element when the valve element is in the open position. For example, the flowable substance may be a liquid or gas purging substance. The purging substance may be obtained by removing and filtering a portion of the fluid stream that the valve is controlling. The purging substance is sprayed against the confronting edge of the disc and adjacent areas to wash away foreign matter and to assure that no packing of foreign material occurs. Preferably, the entire confronting edge of the disc is subjected to the purging action. Alternatively, the flowable substance may be a sealant, such as grease, which is injected through the passage means from an external source to the space between the guard and the confronting edge of the disc. Preferably this space is completely packed with sealant, thereby preventing the intrusion of foreign matter. When the valve is closed, the seal formed by the sealant is broken by the movement of the butterfly valve element and, when the valve is reopened, sealant can again be injected to reestablish the protective packing.

The invention, together with additional features and advantages thereof, may best be understood by reference to the following description taken in connection with the accompanying illustrative drawing.

DESCRIPTION OF THE PREFERRED EMBODIMENTS

Figure 1:
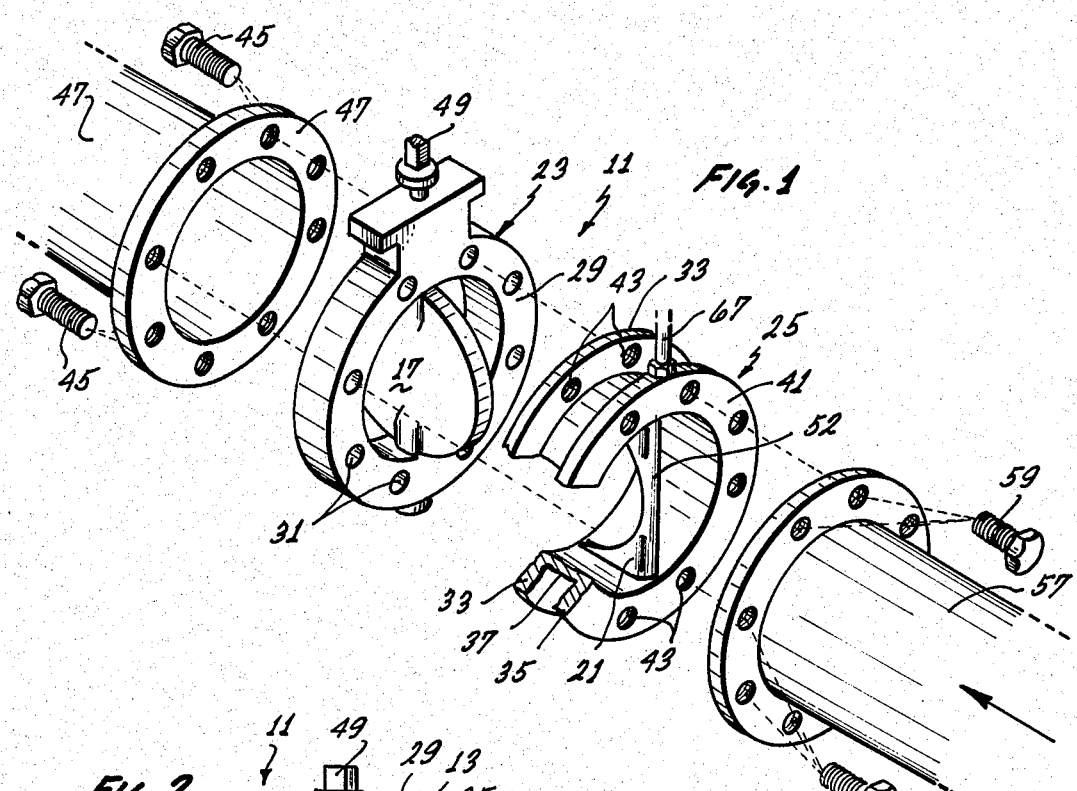
FIG. 1 is an exploded, isometric view with portions broken away of one form of valve constructed in accordance with the teachings of this invention.
Figure 2:
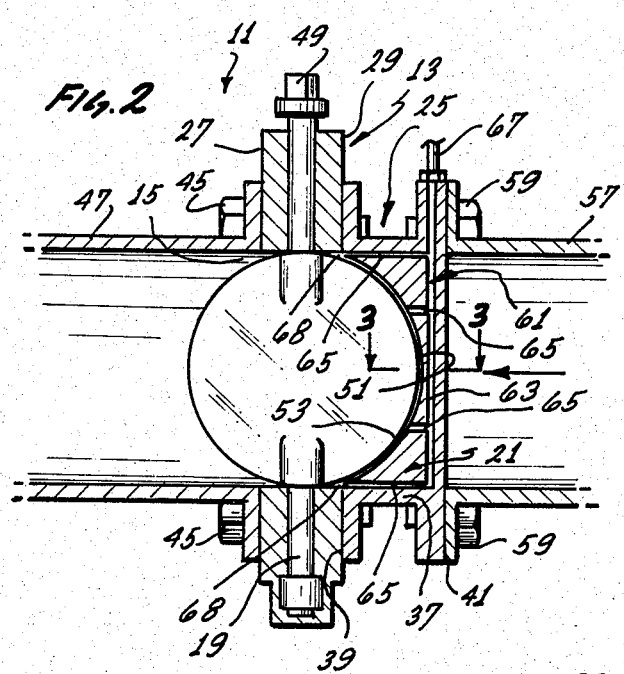
FIG. 2 is a fragmentary, axial, sectional view of the valve of FIG. 1.
Figure 3:
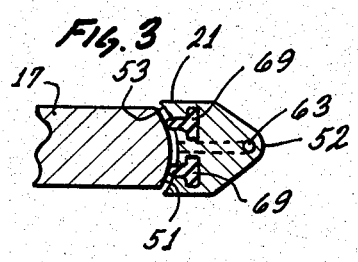
FIG. 3 is a sectional view taken generally along line 3—3 of FIG. 2.

FIGS. 1-3 show a valve 11 which comprises a valve body 13 having a passage 15 extending therethrough and a butterfly valve element in the form of a valve disc 17 pivotally mounted on the valve body by a shaft 19 for pivotal movement about a pivotal axis coincident with the axis of the shaft 19. The valve 11 also includes a guard 21.

The valve body 13 includes an annular valve body section 23 and a guard-mounting ring or second valve body section 25. The valve body section 23 has planar end faces 27 and 29 located in radial planes and a series of bolt holes 31 extending between such faces.

The guard-mounting ring 25 in this embodiment is in the form of a flanged, annular spool having axially spaced inner and outer flanges 33 and 35, respectively, integrally joined by an annulus 37. The inner and outer flanges 33 and 35 have inner and outer planar faces 39 and 41, respectively, lying in radial planes and aligned bolt holes 43 extending axially through both of the flanges. The guard-mounting ring 25 is mounted on the valve body section 23 by bolts 45 so that the inner face 39 confronts and sealingly engages the end face 29. In this embodiment, the bolts 45 also couple a flanged conduit 47 to the valve body section 23 at the end face 27.

Although the valve disc 17 can be of various different configurations, in the embodiment, it is in the form of a thin, cylindrical disc. The disc 17 is fixedly coupled to the shaft 19 in any suitable manner, and the opposite ends of the shaft are journaled in the valve body section 23. An end portion 49 of the shaft 19 projects upwardly out of the valve body section 23 to permit rotation of the shaft and of the valve disc 17. The valve disc 17 is pivotable between an open position shown in FIG. 2 to a second position which, in this embodiment, is the closed position displaced 90 degrees from the open position. In the closed position, flow of fluid through the passage 15 is blocked by the valve disc 17.

The guard 21 is in the form of a strut or a vane, and it extends radially across the annulus 37 and is appropriately attached to the annulus. The guard 21 engages the annulus 37. The guard 21 is constructed of a suitable material, such as a metal, a ceramic, or a metal with an abrasion-resistant coating which can withstand an abrasive environment. The disc 17 has a circular edge 51 which faces upstream in the open position of the valve 11. As shown in FIG. 3 the guard 21 is slightly wider than the disc 17 and the edge 51 of the disc in a plane perpendicular to the pivot axis of the disc.

If desired, the guard 21 may have a tapered nose 52 which may be aerodynamically shaped and which faces upstream. The guard 21 also has a part-circular edge 53 which lies closely adjacent the edge 51 of the valve disc 17 in the open position. The edge 53 is wider than the edge 51 as shown in FIG. 3, and these edges are of corresponding shapes to provide a radially narrow clearance space or gap between them. Thus, the guard 21 is configured and positioned to protect the edge 51 of the valve disc 17 from the fluid stream without blocking flow through the passage 15. The maximum axial dimension of the guard 21 is approximately equal to, or slightly less than, the axial dimension of the guard-mounting ring 25.

The outer face 41 faces outwardly and is adapted to confront, engage and be connected to a flanged tubular member, such as a fluid-carrying conduit 57. Bolts 59 couple the conduit 57 to the outer flange 35. With this construction, the valve 11 can be easily installed into, and removed from, the conduits 47 and 57. In addition, because the guard-mounting ring 25 is essentially independent of the valve body section 23 and the valve disc 17, the guard-mounting ring can be easily installed and removed. Finally, the guard-mounting ring 25 can be provided in virtually any desired diameter, position of rotation or location within the passage 15 so that the guard 21 can be made available to valves of many different sizes.

Passage means 61 is provided in the guard 21 and guard-mounting ring 25 for conveying a flowable substance to a location closely adjacent the edge 51 of the valve disc 17 when the latter is in the open position. More specifically, the passage means 61 comprises a radially extending header 63 in the guard-mounting ring 25 and the guard 21 and a series of passage sections 65 each of which opens at the edge 53 and closely adjacent the edge 51. The header 63 is coupled to a conduit 67 adjacent the periphery of the guard-mounting ring 25 for supplying the flowable substance to the passage means 61. The passage sections 65 are distributed along the length of the edge 51 so that the flowable substance can be supplied to various locations along this edge. Also, by providing passage sections 65 at or closely adjacent the inner periphery of the guard-mounting ring 25, i.e., to locations 68 (FIG. 2), the flowable substance can be provided closely adjacent the shaft 19. As discussed above, the flowable substance may be a purging substance for cleaning the valve disc 17 and portions of the shaft 19 or a sealant, such as grease for sealing the edge 51 against abrasion by particulate matter in the fluid stream flowing through the passage 15.

In this embodiment of the invention, seal means in the form of two sealing rings 69 (FIG. 3) are carried by the guard 21. The sealing rings 69 project from the edge 53 into engagement with the edge 51 of the valve disc 17 in the open position. Thus, a major region of the valve disc is sealed from particulate matter in the fluid stream.

The sealing rings 69 are spaced apart to permit the passage sections 65 to extend between them. When the sealing rings 69 are used, the passage means 61 would ordinarily be used for grease or other sealant rather than for purging.

In use, flow is from right to left in FIG. 2 so that the guard protects the edge 51 in the open position against particulates in the fluid stream. If the valve 11 were used where flow could also occur in the opposite direction, a second guard could be provided on the left side (as viewed in FIG. 2) of the valve disc 17. Sealant can be injected through the passage means to the space between the seals 69 to further protect the edge 51.

Figure 4:
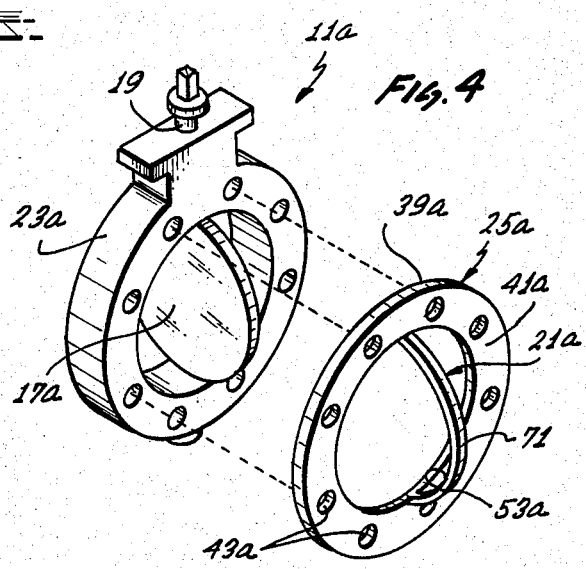
FIG. 4 is an exploded isometric view of a second embodiment of valve constructed in accordance with the teachings of this invention.

FIG. 4 shows a valve 11a which may be identical to the valve 11 in all respects not shown or described. Portions of the valve 11a corresponding to portions of the valve 11 are designated by corresponding reference numerals followed by the letter "a."

The only differences between the valves 11 and 11a are in the configuration of the guard 21a and the guard-mounting ring 25a. This construction has the advantage of the being relatively inexpensive. The guard-mounting ring 25a is in the form of a thin disc or wafer-like cylindrical ring having an inner face 39a and an outer face 41a with bolt holes 43a extending between them. The guard-mounting ring 25a may have no passage means 61. The guard 21a is in the form of an elongated finger of essentially constant cross-sectional configuration, and it projects axially of the ring 25a in extending generally radially across the ring. The guard 21a is attached to the ring 25a at the inner periphery of the ring. The guard 21a has an outer nearly half-circular edge 71 which is essentially parallel to the edge 53a.

Figure 5:
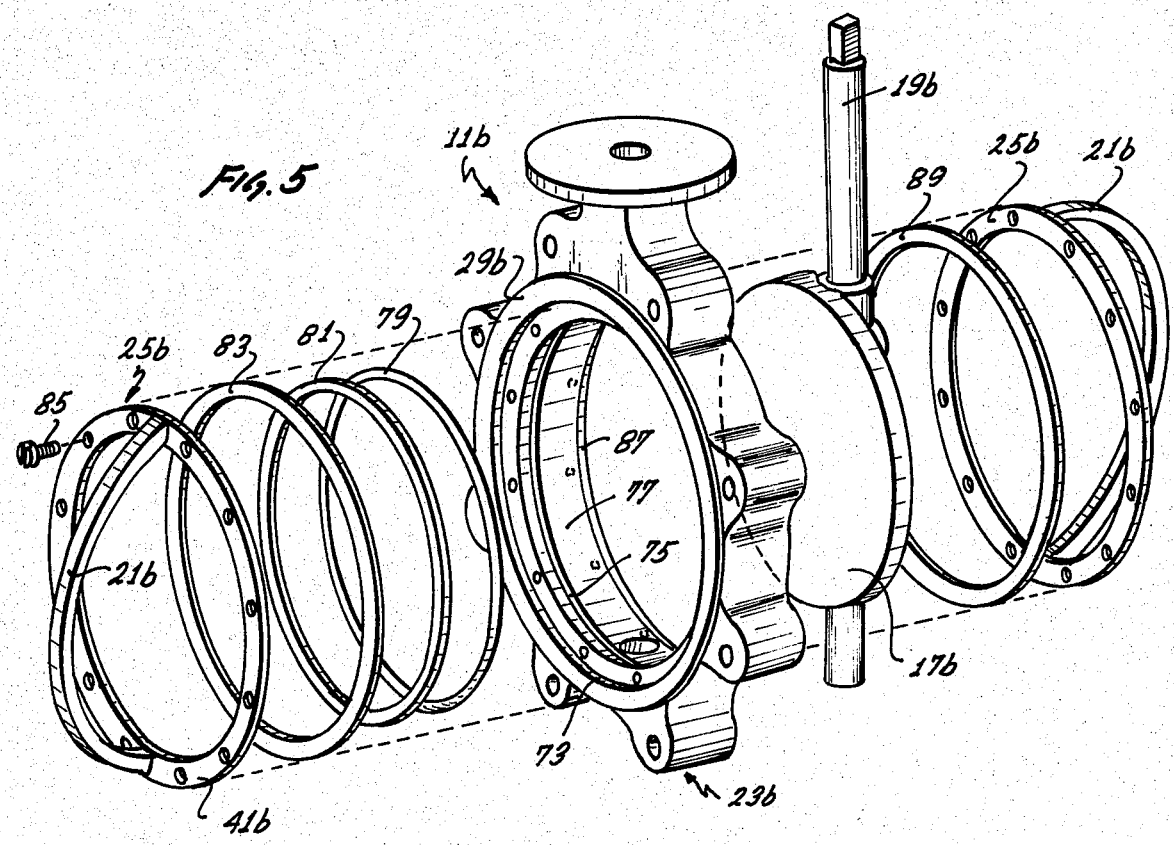
FIG. 5 is an exploded isometric view of a third embodiment of the valve constructed in accordance with the teachings of this invention.

FIG. 5 shows a valve 11b which is identical to the valve 11 in all respects not shown or described herein. Portions of the valve 11b corresponding to portions of the valve 11 are designated by corresponding reference numerals followed by the letter "b."

The primary differences between the valves 11 and 11b are in the construction of the guard 21b and the guard-mounting ring 25b and that the guard-mounting ring 25b is mounted within a counterbore 73 of the valve body section 23b. In addition, two of the guards 21b and guard-mounting rings 25b are provided. This embodiment illustrates the adaptation of this invention to an existing valve by mounting the guard 21b on a seat seal or internal component retaining ring of the valve so that the retaining ring of the valve also serves as the guard-mounting ring 25b.

More specifically, the valve body section 23b also includes a second counterbore 75 and a bore 77. The valve 11b includes a back-up ring 79 and a seal ring 81 both receivable in the counterbore 75 and a gasket 83 which, along with the ring 25b, are receivable within the counterbore 73. The gasket 83 is retained in the counterbore 73 by the guard-mounting ring 25b and by screws 85. The valve body section 23b also includes a counterbore 87 at the other end for receiving a gasket 89 and a second guard-mounting ring 25b and guard 21b.

The guard 21b may be identical to the guard 21a, except that the opposite ends of the guard 21b are attached directly to the outer face 41b of the ring 25b rather than to the inner periphery of the ring. The passage means 61 may be eliminated from this configuration.

Figure 6:
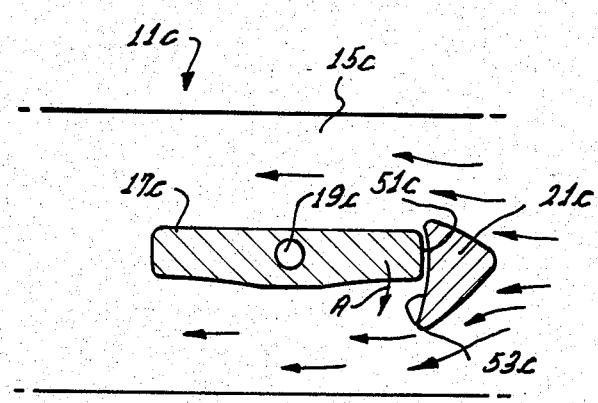
FIG. 6 is a partly schematic, axial, sectional view taken on a plane displaced 90 degrees from the plane of FIG. 2 and illustrating a fourth embodiment of valve of this invention.

FIG. 6 shows how the guard 21c may be used to form an impedance which reduces the fluid force acting on the valve disc 17c near the open position which tends to move the valve disc toward the closed position. The feature shown in FIG. 6 may be included with any or all of the embodiments of this invention. Portions of the construction shown in FIG. 6 corresponding to portions of the valve 11 are designated by corresponding reference numerals followed by the letter "c."

In FIG. 6, a valve 11c includes a valve disc 17c which is pivotable from the 90-degree, fully open position shown about the shaft 19c in the direction of the arrow A through 90 degrees to a closed position. The valve 11c may be identical to the valve 11 of FIG. 1, except that the guard 21c is substantially wider than the edge 51c and also wider than the valve disc 17c to provide the above-mentioned impedance to the fluid stream. Specifically, the guard 21c and the edge 53c extend beyond the edge 51c in the direction of the arrow A so as to reduce the fluid velocity near the edge 51c. This results in a reduction in fluid forces acting on the valve disc 17c which tend to move the valve disc toward the closed position. This facilitates use of the butterfly valve as a throttling valve and reduces the torque necessary to hold the valve disc 17c in the partially open position. Preferably, the guard is sufficiently wide to reduce the fluid force acting on the valve disc 17c between the 60-degree open position and the 90-degree open position of the disc about the shaft 19c because this is the range of positions where the fluid force is the greatest.

Figure 7:
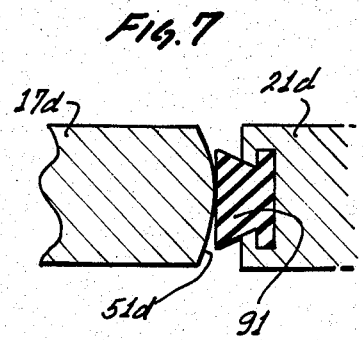
FIG. 7 is an enlarged, fragmentary, sectional view similar to FIG. 3 showing an alternate seal construction.

FIG. 7 shows an alternate form of seal 91 which can be carried by any of the guards described herein. As shown in FIG. 7, the seal 91 is carried by the guard 21d and it engages the confronting edge 51d of the valve disc 17d. The seal 91 seals and protects the central region of the edge 51d from the abrasive action of the fluid stream.

Although exemplary embodiments of the invention have been shown and described, many changes, modifications and substitutions may be made by one having ordinary skill in the art without necessarily departing from the spirit and scope of this invention.

I claim:

1. A valve comprising:
a valve body having a passage extending therethrough through which a fluid stream can flow;
a butterfly valve element;
means for pivotably mounting the valve element in the passage of the valve body for pivotal movement between an open position and a second position, said valve element having an edge which faces generally upstream in said passage in said open position;
a guard;
means for mounting said guard in said passage of the valve body and closely adjacent said edge of the valve element in said open position, said guard being adapted to protect said edge of the valve element from the fluid stream without blocking the passage; and
passage means at least partially in said guard for conveying a flowable substance through the guard to a location closely adjacent said edge of the valve element in said open position.

2. A valve as defined in claim 1 wherein said guard has an edge which confronts said edge of the valve element in said open position and said passage means opens at said edge of said guard.

3. A valve as defined in claim 2 wherein said passage means opens at a plurality of regions along said edge of said guard.

4. A valve as defined in claim 2 wherein said passage means includes a plurality of passage sections opening at spaced locations at said edge of said guard.

5. A valve as defined in claim 1 wherein said valve body includes a first valve body section on which the valve element is mounted, a second valve body section on which the guard is mounted and means for attaching the second valve body section to the first valve body section.

6. A valve as defined in claim 5 wherein said second valve body section includes a spool with inner and outer spaced flanges.

7. A valve as defined in claim 1 including a seal carried by said guard for engaging said edge of the valve element in said open position.

8. A valve as defined in claim 1 wherein the valve element is pivotally mounted on the valve body for movement about a pivot axis and said guard is substantially wider than said edge in a plane perpendicular to said pivot axis to provide an impedance to the fluid stream to reduce the fluid force acting on the valve element near said open position which tends to move the valve element toward said second position.

9. A valve comprising:
a valve body section having a passage extending therethrough through which a fluid stream can flow;
a butterfly valve element;
means for pivotally mounting the valve element in the passage of the valve body section for pivotal movement between an open position and a second position, said valve element having an edge which faces generally upstream in said passage in said open position;

a guard;

a guard mounting ring having inner and outer oppositely directed faces;

means for mounting said guard on the guard mounting ring with the guard extending generally radially across said guard mounting ring;

means for mounting the guard mounting ring with the guard thereon on the valve body section with the inner face confronting a surface of the valve body section and with the guard being closely adjacent said edge of the valve element in said open position, said guard being adapted to protect said edge of the valve element from the fluid stream without blocking the passage; and said outer face facing outwardly and being adapted to confront and be coupled to a tubular member.

10. A valve as defined in claim 9 wherein the valve element is mounted for pivotal movement about a pivot axis and said guard is at least as wide as the valve element in a plane perpendicular to said pivot axis.

11. A valve as defined in claim 9 wherein said valve element is mounted for movement about a pivot axis and said guard is substantially wider than said edge of said valve element in a plane perpendicular to said pivot axis to provide an impedance to the fluid stream to reduce the fluid force acting on the valve element near said open position which tends to move the valve element toward said second position.

12. A valve as defined in claim 9 including a seal carried by said guard for engaging said edge of the valve element in said open position.

13. A valve as defined in claim 9 wherein said guard and said guard mounting ring are integral.

14. A valve as defined in claim 9 wherein said guard mounting ring includes a spool with inner and outer spaced flanges having said inner and outer oppositely directed faces thereon, respectively.

15. A valve as defined in claim 14 wherein the axial dimensions of said guard and said spool are approximately equal.

16. A valve as defined in claim 9 wherein said guard mounting ring includes a disc-like ring and said guard projects axially of said disc-like ring in extending generally radially across said guard mounting ring.

17. A valve as defined in claim 16 wherein said valve body section includes a bore and a counterbore at least partially defining said passage and said disc-like ring is received within said counterbore and said valve includes a member retained in one of said bore and counterbore by the disc-like ring.

18. A valve as defined in claim 9 wherein said guard is an elongated, arcuate finger-like element.

19. A valve comprising:

a valve body having a passage extending therethrough through which a fluid stream can flow;

a butterfly valve element;

means for pivotably mounting the valve element in the passage of the valve body for pivotal movement about a pivot axis between an open position and a second position, said valve element having an edge which faces generally upstream in said passage in said open position;

a guard;

means for mounting said guard in said passage of the valve body closely adjacent said edge of the valve element in said open position, said guard being adapted to protect said edge of the valve element from the fluid stream without blocking the passage; and said guard being substantially wider than said edge in a plane perpendicular to said pivot axis to provide an impedance to the fluid stream to reduce the fluid force acting on the valve element near said open position which tends to move the valve element toward said second position.

20. A valve as defined in claim 3 wherein the second position is the 0-degree position and said open position is the 90-degree position about said pivot axis and said guard is sufficiently wide in said plane to reduce the fluid force acting on the valve element between the 60 degree and 90 degree positions of the valve element.

* * * * *